US006976601B2

(12) United States Patent
Adam

(10) Patent No.: US 6,976,601 B2
(45) Date of Patent: Dec. 20, 2005

(54) ELECTRICAL EQUIPMENT BOX WITH FLEXIBLE FIXING ARRANGEMENTS

(75) Inventor: Damien Adam, Domfront en Champagne (FR)

(73) Assignees: Legrand, Limoges (FR); Legrand SNC, Limoges (FR)

( * ) Notice: Subject to any disclaimer, the term of this patent is extended or adjusted under 35 U.S.C. 154(b) by 20 days.

(21) Appl. No.: 10/382,858

(22) Filed: Mar. 7, 2003

(65) Prior Publication Data

US 2003/0168450 A1    Sep. 11, 2003

(30) Foreign Application Priority Data

Mar. 7, 2002  (FR) .................................. 02 02893

(51) Int. Cl.$^7$ .............................................. H02G 3/08
(52) U.S. Cl. ..................... 220/3.3; 174/50; 174/57; 220/3.7; 220/4.02
(58) Field of Search ................... 220/3.3, 3.7, 3.9, 220/4.02, 480, 481; 174/57, 58

(56) References Cited

U.S. PATENT DOCUMENTS

| 3,187,084 A | * | 6/1965 | Stillman et al. ............... 174/58 |
| 6,455,773 B2 | | 9/2002 | Bellanger |
| 6,641,092 B1 | | 11/2003 | Adam et al. |

FOREIGN PATENT DOCUMENTS

| EP | 0 508 175 A2 | 10/1992 |
| EP | 0 840 418 | 5/1998 |
| EP | 1 096 630 | 5/2001 |
| EP | 1 156 568 | 11/2001 |
| FR | 1 058 517 | 5/1954 |

* cited by examiner

Primary Examiner—Joseph C. Merek
(74) Attorney, Agent, or Firm—Young & Thompson

(57) ABSTRACT

An electrical equipment box includes a back incorporating one or more holes of elongate shape in a direction X for fixing the box to a wall. The hole or each hole is in a stud attached to the back by a flexible connection allowing a small offset of the hole relative to a stable original position in a direction Y parallel to the plane of the back and perpendicular to the direction X.

20 Claims, 3 Drawing Sheets

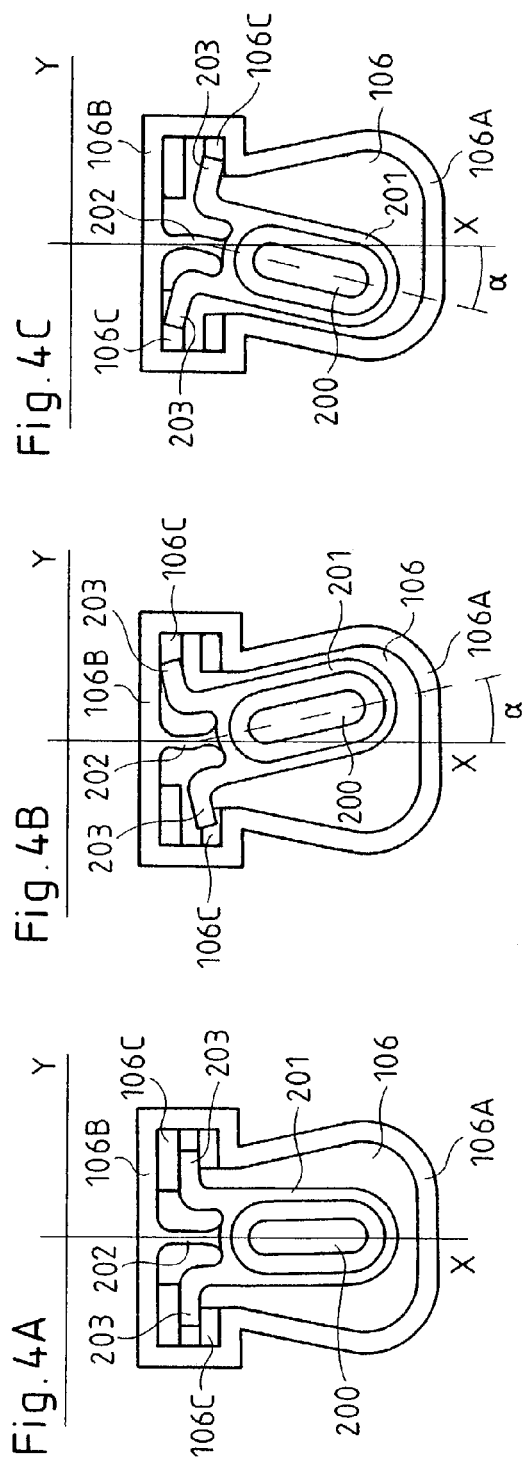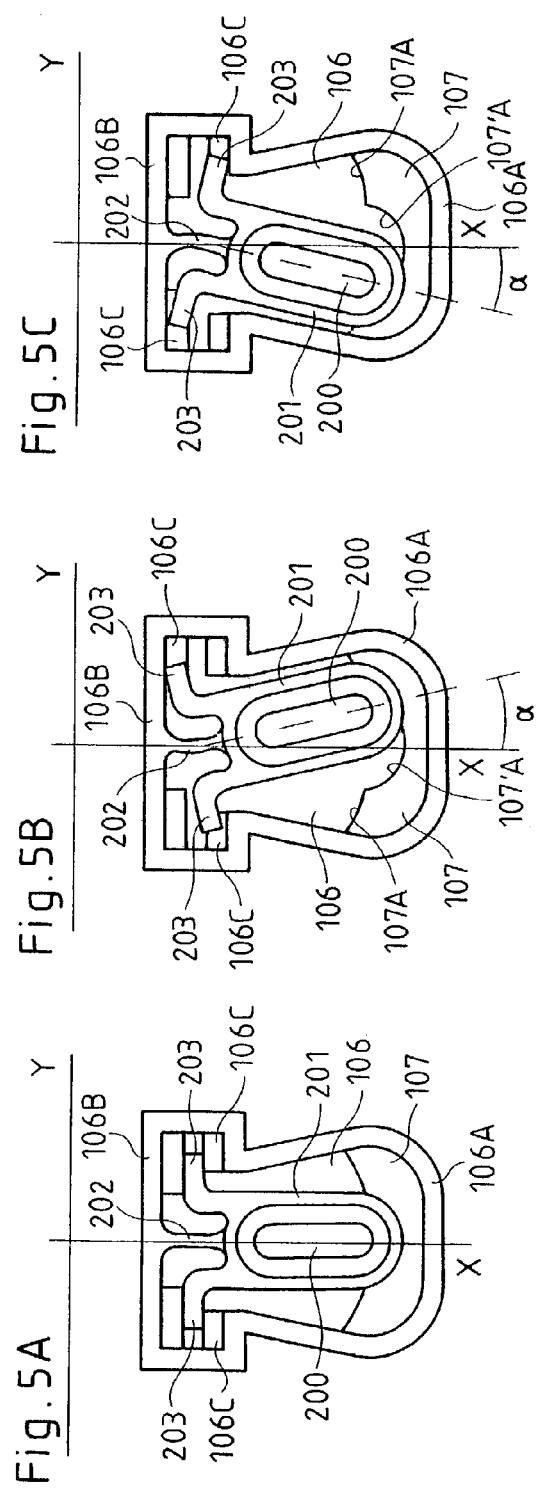

ELECTRICAL EQUIPMENT BOX WITH FLEXIBLE FIXING ARRANGEMENTS

BACKGROUND OF THE INVENTION

1. Field of the Invention

The present invention relates generally to electrical equipment boxes and in particular to a box having a back with holes for fixing the box to a wall which are of elongate shape in a direction X.

The box can be an outlet box of an installation buried in a wall or a box to be attached to trunking for routing electrical conductors or cables.

The box can equally well be a box adapted to be surface-mounted on a wall and connected to cables, also surface-mounted on the wall, either bare or in conduit.

The holes in the box are usually of oblong shape.

2. Description of the Prior Art

Boxes of the above type are described in the documents EP 0 508 175 and US 2001/0047876, for example.

Although the oblong holes allow adjustment of the box when it is fixed to the wall to line up the oblong holes with the holes drilled in the wall, the error in the position of the drilled hole in the wall relative to the oblong hole in the back of the box may be too great for the oblong hole to compensate for it.

This problem occurs all the more often when, as is generally the case, the back of the box comprises at least four holes, with the implication that four corresponding holes should be drilled in the wall to which the box must be attached.

SUMMARY OF THE INVENTION

To solve the above problem, the present invention proposes an electrical equipment box including a back incorporating one or more holes of elongate shape in a direction X for fixing the box to a wall, wherein the hole or each hole is in a stud attached to the back by a flexible connection allowing a small offset of the hole relative to a stable original position in a direction Y parallel to the plane of the back and perpendicular to the direction X.

Thus, in accordance with the invention, the flexible connection attaching the stud with the hole to the back of the box advantageously allows slight decentering of the hole so that its position can be adjusted in a direction transverse to its lengthwise direction to suit the position of the hole drilled in the wall on which the box is to be mounted.

Other nonlimiting and advantageous features of an electrical equipment box in accordance with the invention are as follows:

- the hole or each hole is offset by pivoting its flexible connection in the plane of the back;
- the stud or each stud provided with a hole lies in an opening in the back and is attached by the flexible connection to one edge of the opening;
- a thin wall is provided for the stud or for each stud and extends from an edge of the opening opposite that to which the stud is attached by the flexible connection, and under the stud, so as to close off a portion of the opening, the thin wall having a free edge shaped so that when the stud is offset relative to its stable original position it bears on the thin wall to press it against the wall to which the box is to be fixed;
- the stud or each stud carries, on respective opposite sides of the flexible connection, abutments adapted to bear against a portion of the back to press the back against the wall;
- the stud or each stud is formed in one piece with the flexible connection associated therewith;
- the flexible connection or each flexible connection consists of a flexible tongue that extends in the direction X of each hole and perpendicularly to an edge of the back;
- the flexible tongue or each flexible tongue is molded in one piece with the back from a plastics material;
- the hole or each hole has an oblong shape.

The following description with reference to the accompanying drawings, which are provided by way of non-limiting example, explains in what the invention consists and how it can be put into effect.

BRIEF DESCRIPTION OF THE DRAWINGS

FIGS. 4A to 4C are diagrammatic front views showing three different positions of a hole in a variant of the FIG. 1 plate.

FIGS. 5A to 5C are diagrammatic front views showing three different positions of a hole in the FIG. 1 plate.

DETAILED DESCRIPTION OF THE PREFERRED EMBODIMENTS

Figure 1:
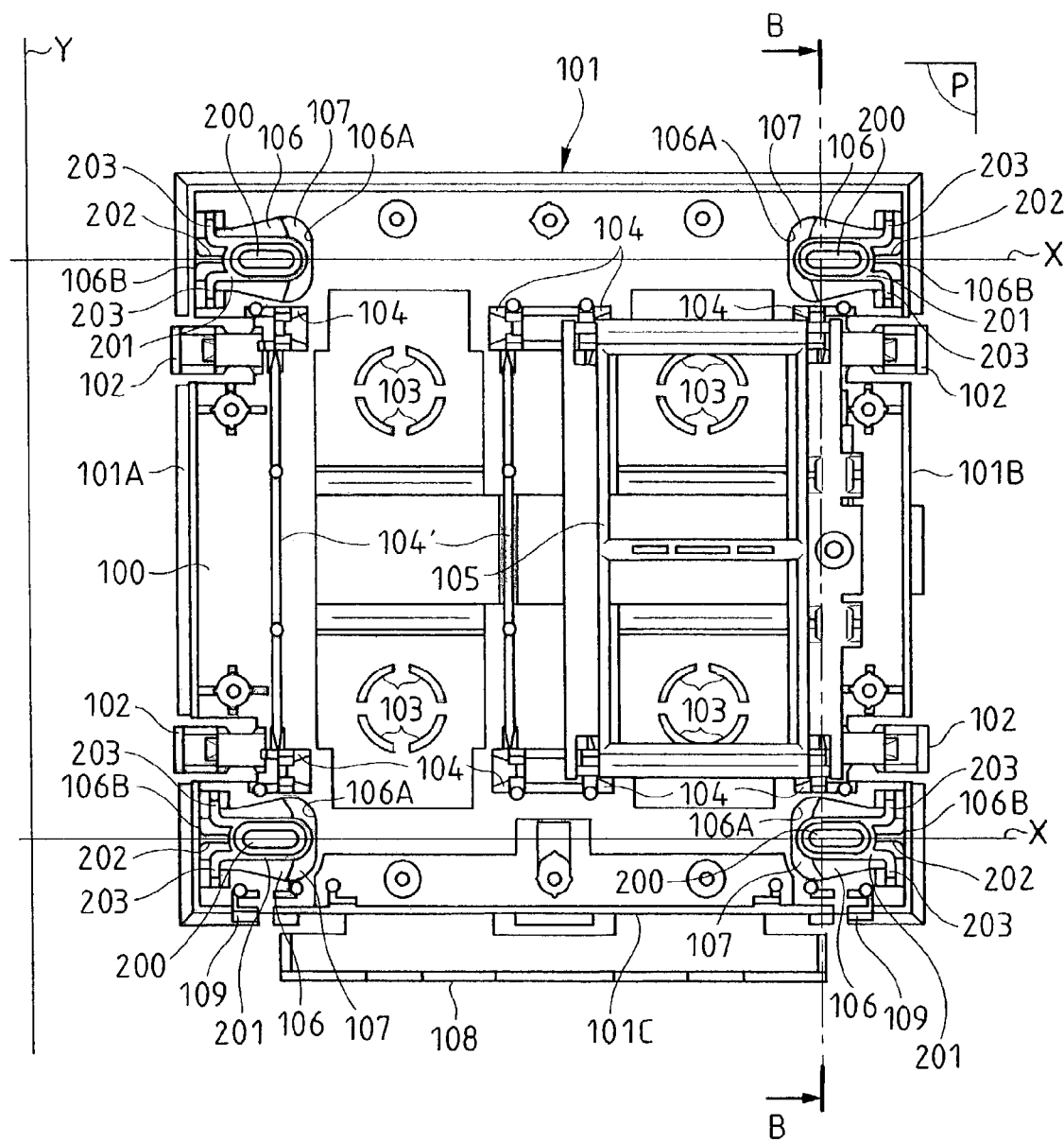
FIG. 1 is a diagrammatic top view of a plate forming the back of an electrical equipment box according to the invention.
Figure 2:
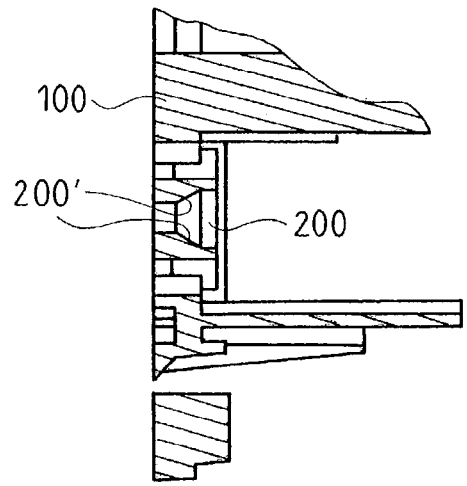
FIG. 2 is a diagrammatic view of the FIG. 1 plate in section taken along a line B—B passing through a hole.
Figure 3:
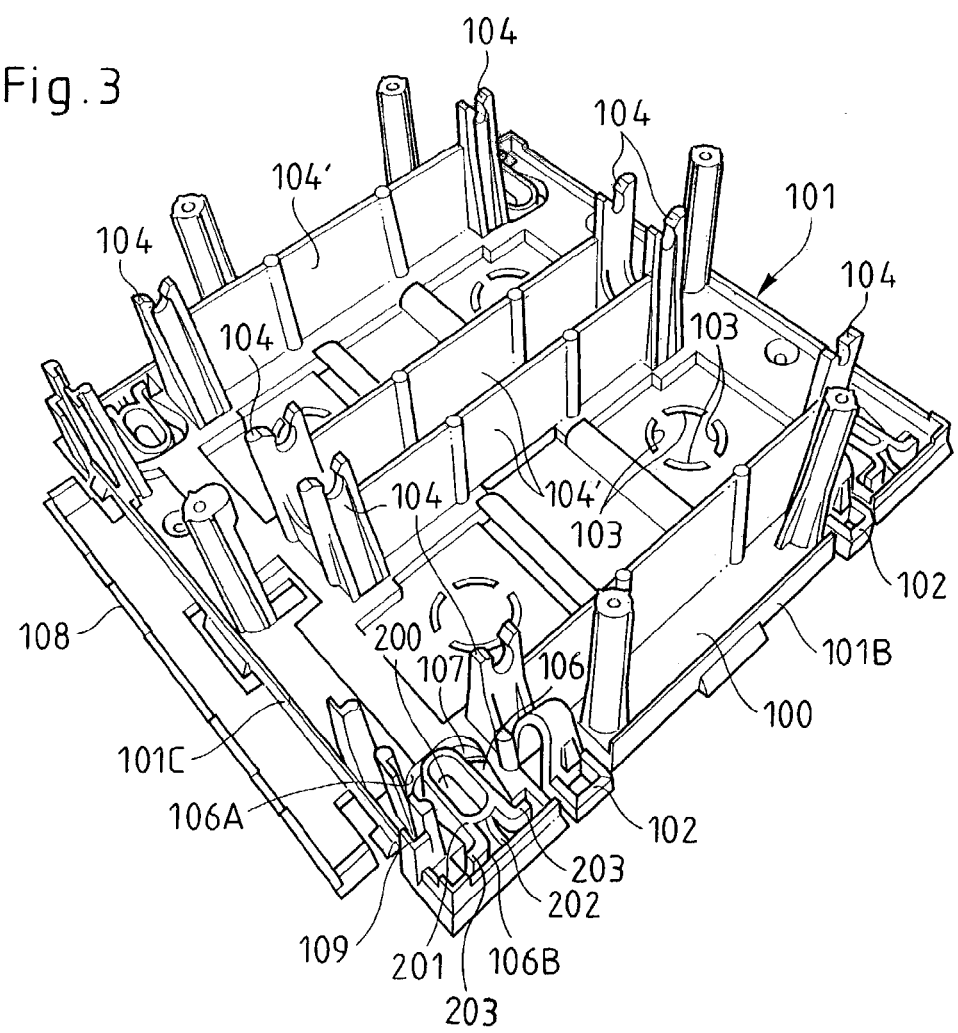
FIG. 3 is a diagrammatic three-quarter perspective view of the FIG. 1 plate.

FIGS. 1 to 3 show a plate 100 forming the back of an electrical equipment box.

The plate 100 is well known in the art and is not described in detail here.

Essentially, it is square and adapted to receive a closure cover (not shown) whose peripheral edge fits to the peripheral edge 101 of the plate 100.

It has clips 102 on two parallel edges 101A, 101B for clipping on the closure cover.

The plate 100 is intended to be attached to a wall (not shown), either at an outlet from an electrical installation embedded in the wall, or along trunking for routing electrical conductors or cables.

The plate 100 shown in FIGS. 1 to 3 carries projecting columns 104 to the tops of which electrical equipment supports 105 can be fitted, for example clipped.

The columns 104 are joined in pairs by partitions 104' perpendicular to the plate. The partitions 104' define between them housings for electrical equipment mounted on the electrical equipment supports 105 clipped to the tops of the columns 104.

The plate 100 has circular knock-outs 103 in each electrical equipment housing.

If the plate 100 is intended to be mounted at the outlet of an electrical installation embedded in a wall, the knock-outs 103 are broken away by the installer to create openings through which electrical cables or conductors enter the box, to be connected to the electrical equipment concerned mounted on the electrical equipment supports 105.

On another edge 101C of the plate 100, which is perpendicular to the edges 101A, 101B, there are arrangements 108, 109 for fitting a canopy for connecting the interior of the box to the interior of a trunking base section if said plate is positioned along trunking.

These arrangements include, firstly, a platform 108 in the plane P of the plate 100 and projecting from said edge 101C and, secondly, two columns 109 perpendicular to the plane P of the plate 100, at respective opposite ends of the platform 108 and incorporating a longitudinal opening forming groove means for fitting the canopy (which is not shown).

The plate forming the back 100 of the box advantageously includes at least one hole for fixing the box to a wall; there are four holes 200 in this example.

Each hole 200 is near one corner of the plate 100. Each hole 200 has an elongate shape in a direction X. The holes 200 are disposed in pairs on the same line so that they extend toward each other in the direction X. In this example they have an oblong shape.

As shown more particularly in the FIG. 2 cross section, each hole 200 in the plate 100 has a section that decreases in size because its peripheral wall 200' has a funnel-shaped profile opening onto a cylindrical cross section corresponding to the diameter of the shank of a box fixing member that is anchored in the wall through the hole 200.

The funnel-shaped profile of the peripheral wall 200' of each hole 200 facilitates the insertion of each fixing member into its hole when fixing the plate 100 to the corresponding wall.

Each hole 200 is advantageously part of a stud 201 attached to the plate 100 of the box by a flexible connection 202 allowing a small offset of the hole 200 in a direction parallel to the plane P of the plate 100 in a direction Y perpendicular to the direction X relative to a stable origin position shown in FIGS. 4A and 5A in particular.

As shown in FIGS. 4B, 4C, 5B and 5C, each hole 200 is offset by pivoting the flexible connection 202 in the plane P (i.e. the XY plane) of the plate 100.

Each flexible connection 202 attaching a stud 201 to the plate 100 consists in this example of a flexible tongue perpendicular to the edge 101A or 101B of the plate 100.

Each stud 201 is formed in one piece with the associated flexible connection 202, which is molded from a plastics material at the same time as the plate 100.

To be more specific, each stud 101 is at a free end of the flexible tongue constituting the flexible connection 202, extending toward the interior of the plate 100.

To this end, each stud 201 with one of the holes 200 lies in an opening 106 in the plate 100 and is connected by the flexible connection 202 to an edge 106B of the opening 106.

In this example each opening 106 is substantially in the shape of the Greek letter Ω, the edge 106B of the opening 106 to which the stud 201 is attached by the flexible connection 202 being parallel to the edge 101A or 101B of the plate 100.

Furthermore, as shown in FIGS. 1, 4A to 4C, and 5A to 5C in particular, each stud 201 carries, on respective opposite sides of the flexible connection 202, abutments 203 that extend in the general direction Y in the rectangular portion of the opening 106. The abutments 203 are molded from a plastics material in one piece with each stud 201.

The abutments 203 are adapted to abut against a portion 106C of the plate 100 of the box, to press the plate against the wall.

As shown in FIGS. 4B, 4C and 5B, 5C, the angular movement α of each stud 201 is approximately six degrees to either side of the direction X.

The offset is obtained by bending each flexible tongue constituting the flexible connection 202 between the plate 100 and the corresponding stud 201 with the hole 200.

Furthermore, in the embodiment shown in FIGS. 1 and 3 and in FIGS. 5A, 5B and 5C, there is provided for each stud 201 a thin wall 107 that extends from an edge 106A of the opening 106 opposite the edge 106B to which the stud 201 is attached by the flexible connection 202, underneath the stud 201, so as to close off a portion of the opening 106.

Each thin wall 107 has a rounded free edge 107A with a central notch 107'A accommodating one end of a stud 201 with its hole 200.

The central notch 107'A is mainly provided for reasons connected with removing from the mold the single component consisting of the plate 100 carrying the stud 201.

The free edge 107A of the thin wall 107 is shaped so that when the stud 201 is moved relative to its stable original position (see FIGS. 5B and 5C), it bears on the thin wall 107 to press it against the wall to which the box is to be fixed.

Accordingly, as shown in FIGS. 4A to 4C and 5A to 5C, each hole 200 in the plate 100 of the box can assume a position adjusted as a function of the position of the hole drilled in the wall to which the box is to be fixed, in order to line up with the drilled hole.

The offsetting of the hole 200 relative to its stable original position shown in FIGS. 4A and 5A provides an additional degree of freedom in the direction Y to that provided by the elongation of the hole 200 in the direction X.

In the configuration in which each hole 200 is offset relative to the stable original position shown in FIGS. 4A and 5A, for example toward the left or toward the right as shown in FIGS. 4B, 4C and 5B, 5C, the fixing member inserted through the hole 200 and anchored in the wall, for example a screw, locks the stud 201 in position, the abutments 203 bearing against the portions 106C of the plate.

Furthermore, in the embodiments shown in FIGS. 5B and 5C, when the stud 201 takes up a position offset relative to the axis X, its free end, i.e. the end opposite the end with the abutments 203, bears on the thin wall 107 and presses it against the wall to which the box is to be fixed.

The present invention is in no way limited to the embodiments described and shown, many variants of which conforming to the spirit of the invention will suggest themselves to the person skilled in the art.

In particular, in a variant that is not shown, the back of the box can be formed in one piece with its lateral walls. In this case, the closure cover is essentially flat and fits to the top edges of the lateral walls, the latter upstanding perpendicularly from the back.

What is claimed is:

1. An electrical equipment box, comprising:
a back with parallel vertical edges and parallel horizontal edges;
plural flexible studs attached to said back and located within by the parallel vertical and horizontal edges, each stud running in a direction X and flexibly positionable within the parallel vertical and horizontal edges in a direction Y parallel to the plane of said back and perpendicular to the direction X;
a space located intermediate the back and an exterior edge of each stud, said space being U-shaped and having converging sides,
the space allowing the flexible stud to be flexibly offset, relative to a stable original position, in the direction Y, said offsetting of said stud providing plural positions of said hole inside the back of the box within the parallel vertical and horizontal edges along the direction Y;

each stud incorporating a hole of elongate shape in the direction X for fixing the box to a wall, wherein each stud is attached to said back by a flexible connection allowing a small offset of said hole relative to the stable original position in the direction Y parallel to the plane of said back and perpendicular to said direction X, said small offset of said hole providing several positions of said hole inside the back of the box.

2. The box claimed in claim 1 wherein each hole is offset by pivoting its flexible connection in said plane of said back.

3. The box claimed in claim 1 wherein,
said space is an opening in said back, and
each stud and is attached by said flexible connection to one edge of said opening.

4. The box claimed in claim 3 wherein a thin wall is provided for each stud and extends from an edge of said opening opposite that to which said stud is attached by said flexible connection, and under said stud, so as to close off a portion of said opening, said thin wall having a free edge shaped so that when said stud is offset relative to its stable original position, said stud bears on said thin wall to press said thin wall against said wall to which said box is to be fixed.

5. The box claimed in claim 1 wherein each stud carries, on respective opposite sides of said flexible connection, abutments adapted to bear against a portion of said back to press said back against said wall.

6. The box claimed in claim 1 wherein each stud is formed in one piece with said flexible connection associated therewith.

7. The box claimed in claim 1 wherein each flexible connection consists of a flexible tongue that extends in said direction X of each hole and perpendicularly to an edge of said back.

8. The box claimed in claim 7 wherein each flexible tongue is molded in one piece with said back from a plastics material.

9. The box claimed in claim 1 wherein each hole has an oblong shape.

10. An electrical equipment box, comprising:
a back with parallel vertical edges and parallel horizontal edges;
plural flexible studs attached to said back and located within the parallel vertical and horizontal edges, each stud running in a direction X and flexibly positionable within the parallel vertical and horizontal edges in a direction Y parallel to the plane of said back and perpendicular to the direction X;
a space located intermediate the back and an exterior edge of each stud, the space being U-shaped and having converging sides; and
a hole within each flexible stud for fixing the box to a wall,
wherein the space allows the flexible stud to be flexibly offset, relative to a stable original position, in the direction Y, said offsetting of said stud providing plural positions of said hole inside the back of the box within the rectangle along the direction Y.

11. An electrical equipment box, comprising:
a plate (100) forming a back of the electrical equipment box and having parallel vertical edges and parallel horizontal edges;
plural flexible studs (201) attached to said back and located within the parallel vertical and horizontal edges, each stud running in a direction X and flexibly positionable within the parallel vertical and horizontal edges in a direction Y parallel to the plane of said back and perpendicular to the direction X;
a space located intermediate the plate and an exterior edge of each stud, the space being U-shaped and having converging sides, the space allowing the flexible stud to be flexibly offset, relative to a stable original position, in the direction Y, said offsetting of said stud providing plural positions of said hole inside the back of the box within the parallel vertical and horizontal edges along the direction Y;
a mounting hole (200) located within each flexible stud, the hole being elongated in a direction X for fixing the box to a wall;
a peripheral edge (101) shaped to receive a peripheral edge of a closure cover;
removable knock-outs (103) within an interior region of the plate, the knock-outs sized to create openings through which electrical conductors enter the box, wherein,
at least two of the holes are disposed as a pair on a same line extending in the direction X, and
the flexible stud is flexibly offset-able, relative to the stable original position, in a direction Y, said offsetting of said stud providing plural positions of said hole inside the back of the box within the rectangle along the direction Y.

12. The box of claim 11, further comprising:
clips (102) on two parallel edges of the plate; and
projecting columns (104) carried on the plate, the columns having tops to mount electrical equipment; and
partitions located perpendicular to the plate and joining the columns defining housings for electrical equipment mounted on the columns.

13. The box of claim 11, wherein, there are four holes, each hole located adjacent one corner of the plate.

14. The box of claim 11, wherein,
a space located intermediate the plate and each stud defines a single plane, and
the stud is flexibly movable within the space along the plane, relative to a stable original position, in a direction Y parallel to the plane of said back and perpendicular to said direction X.

15. The box of claim 14, wherein the space has cross-sections decreasing in size approaching an adjacent plate edge.

16. The box of claim 14, wherein, each hole has a section that decreases in size and has a funnel-shaped profile opening onto a cylindrical cross-section.

17. The box of claim 14, further comprising:
a flexible connection (202) connecting each stud to the plate,
the connection allowing an offset of the hole in the direction parallel to the plane P of the plate in the direction Y perpendicular to the direction X relative to a stable original position.

18. The box of claim 17, wherein a thickness of the flexible connection is less than a distance between two parallel edges of an adjacent hole.

19. The box of claim 17, wherein the plate, the connection, and the stud are all plastic.

20. The box of claim 17, wherein the connection allows the stud to be flexibly moved, relative to the stable original position, into an offset position where an edge of the stud is parallel to an adjacent edge of the plate.

* * * * *